(12) United States Patent
Cavalieri et al.

(10) Patent No.: US 10,160,848 B2
(45) Date of Patent: Dec. 25, 2018

(54) POLYOLEFIN COMPOSITIONS AND ARTICLES MANUFACTURED THEREFROM

(71) Applicant: BASELL POLYOLEFINE GmbH, Wesseling (DE)

(72) Inventors: Claudio Cavalieri, Ferrara (IT); Michele Grazzi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/778,974

(22) PCT Filed: Nov. 8, 2016

(86) PCT No.: PCT/EP2016/077019
§ 371 (c)(1),
(2) Date: May 24, 2018

(87) PCT Pub. No.: WO2017/089125
PCT Pub. Date: Jun. 1, 2017

(65) Prior Publication Data
US 2018/0334557 A1    Nov. 22, 2018

(30) Foreign Application Priority Data
Nov. 24, 2015    (EP) .................................... 15195965

(51) Int. Cl.
*C08L 23/08*    (2006.01)
*C08J 5/18*    (2006.01)

(52) U.S. Cl.
CPC .............. *C08L 23/0815* (2013.01); *C08J 5/18* (2013.01); *C08J 2323/08* (2013.01); *C08J 2423/08* (2013.01); *C08L 2205/025* (2013.01); *C08L 2314/02* (2013.01)

(58) Field of Classification Search
CPC ........... C08L 23/0815; C08L 2205/025; C08L 2314/02; C08L 23/16; C08L 2205/02; C08L 2205/03; C08L 2308/00; C08L 23/04; C08J 5/18; C08J 2323/08; C08J 2423/08; B29C 49/0005

See application file for complete search history.

(56) References Cited

U.S. PATENT DOCUMENTS

2013/0029125 A1 *   1/2013   Tse et al. ................ C08L 23/04
                                                            428/220
2014/0045998 A1     2/2014   Ceccarani et al.

FOREIGN PATENT DOCUMENTS

| EP | 2743307 A1 | 6/2014 |
|---|---|---|
| WO | 2015055433 A1 | 4/2015 |
| WO | 2015180919 A1 | 12/2015 |

OTHER PUBLICATIONS

International Search Report and Written Opinion dated Jan. 25, 2017 (Jan. 25, 2017) for Corresponding PCT/EP2016/077019.

* cited by examiner

Primary Examiner — Nathan M Nutter

(57) ABSTRACT

A polyolefin composition made from or containing:
A) from 55 to 75 wt % of a polyethylene having a density of 0.920 to 0.940 g/cm$^3$ and a fraction soluble in xylene (XS$_A$) of less than 10%, based upon the weight of the polyethylene;
B) from 25 to 45 wt. % of a copolymer of ethylene with one or more comonomers selected from α-olefins having formula HC$_2$=CHR$^I$, where R$^I$ is an alkyl radical, linear or branched, having from 1 to 8 carbon atoms, made from or containing from 50 to 70 wt. %, based upon the weight of the copolymer of ethylene, of ethylene and having a fraction soluble in xylene (XS$_B$) of at least about 50 wt. %, based upon the weight of the copolymer of ethylene; the polyolefin composition having a flexural modulus of less than 260 MPa as measured according to ISO 178. The polyolefin composition is useful for producing geomembranes.

14 Claims, No Drawings

POLYOLEFIN COMPOSITIONS AND ARTICLES MANUFACTURED THEREFROM

FIELD OF THE INVENTION

In general, the present disclosure relates to the field of chemistry. More specifically, the present disclosure relates to polymer chemistry. In particular, the present disclosure relates to a polyolefin composition made from or containing a polyethylene having a density of about 0.920 to about 0.940 g/cm$^3$ and an ethylene copolymer and articles made therefrom.

BACKGROUND OF THE INVENTION

Polymer materials for geomembranes are selected for chemical resistance, mechanical properties (elastic modulus, yield strength, puncture/tear resistance), weathering resistance, product life expectancy, installation factors and cost effectiveness. The properties of polymeric geomembranes are effected by polymer structure, molecular weight and crystallinity. The degree of crystallinity effects the performance properties of the geomembrane, including the mechanical properties and chemical resistance.

Medium density polyethylene ("MDPE") and high density polyethylene ("HDPE") have been used in polyolefin-based geomembrane applications. It is believed that the crystalline nature of these polymers is responsible for density, stiffness, permeability, and chemical resistance. As compared to other polymers, MDPE and HDPE are low cost polymers and have good physical property balances, chemical resistance, and ultraviolet weathering performance. Also, MDPE and HDPE are easily processed in blown and flat die extrusion processes.

Unfortunately, geomembranes made with MDPE or HDPE tend to lack flexibility and impact resistance. Those characteristics can be more pronounced in cold climate or cold environment applications. For some geomembrane applications, it is useful to provide improved polyolefin-based compositions made with or containing MDPE or HDPE, having flexibility, impact resistance, dimensional stability, environmental stress cracking resistance (ESCR), and temperature resistance.

SUMMARY OF THE INVENTION

In a general embodiment, the present disclosure provides a polyolefin composition made from or containing:
A) from about 55 to about 75 weight percent ("wt. %"), based upon the total weight of the polyolefin composition, of a polyethylene having a density of about 0.920 to about 0.940 g/cm$^3$ and a fraction soluble in xylene (XS$_A$) of less than about 10 wt. %, based upon the weight of the polyethylene, the polyethylene made from or containing ethylene and one or more comonomers selected from α-olefins having formula CH$_2$=CHR, wherein R is an alkyl radical, linear or branched, having from 1 to 10 carbon atoms; and
B) from about 25 to about 45 wt. %, based upon the total weight of the polyolefin composition, of a copolymer of ethylene with one or more comonomers selected from α-olefins having formula HC$_2$=CHR$^I$, where R$^I$ is an alkyl radical, linear or branched, having from 1 to 8 carbon atoms, made from or containing from about 50 to about 70 wt. %, based upon the weight of the copolymer of ethylene, of ethylene and having a fraction soluble in xylene (XS$_B$) of at least about 50 wt. %,
based upon the weight of the copolymer of ethylene, the polyolefin composition having a flexural modulus of less than about 260 MPa as measured according to ISO 178.

In some embodiments, the polyolefin composition is used to manufacture articles such as sheets, geomembranes, roofing membranes, soft skins, drawn tapes, drawn fibers, and drawn filaments. In some embodiments, the polyolefin composition is used to manufacture geomembranes.

DETAILED DESCRIPTION OF THE INVENTION

Definitions and Test Methods

In the present description, "room temperature" means a temperature of about 25° C.

Solubility in xylene (XS) was determined by the following procedure: 2.5 g of polymer and 250 ml of xylene were introduced in a glass flask equipped with a refrigerator and a magnetic stirrer. The temperature was raised in 30 minutes up to the boiling point of the solvent. The solution was kept under reflux and stirring for further 30 minutes. The closed flask was then left to reach 100° C. (heating switched off) and then the flask was placed in a thermostatic water bath at 25° C. for 30 minutes. A solid was formed. The solid was filtered on quick filtering paper. 100 ml of the filtered liquid was poured in a pre-weighed aluminum container, which was heated on a heating plate under nitrogen flow to remove the solvent by evaporation. The container was then kept in an oven at 80° C. under vacuum until constant weight was obtained. The weight percentage of polymer soluble in xylene at room temperature was then calculated.

Density was determined according to ISO 1183 at 23° C.

Shore D were determined according to ISO 868.

Melt Flow Rate (MFR) was determined according to ISO 1133 at 230° C. with a load of 2.16 kg.

Melting temperature was determined by differential scanning calorimetry (DSC) according to ISO 11357-3. A sample weighing 6±1 mg was heated to 200±1° C. at a rate of 20° C./min and kept at 200±1° C. for 2 minutes in nitrogen stream and was then cooled at a rate of 20° C./min to 40±2° C., and then kept at this temperature for 2 min. Then, the sample was again melted at a temperature rise rate of 20° C./min up to 200° C.±1. The melting scan was recorded, a thermogram was obtained, and, from the thermogram, temperatures corresponding to peaks were read. The temperature corresponding to the most intense melting peak recorded during the second fusion was taken as the melting temperature.

Intrinsic Viscosity (I.V.) was determined in tetrahydronaphthalene at 135° C. The sample was dissolved in tetrahydronaphthalene at 135° C. and then poured into a capillary viscometer. The viscometer tube (Ubbelohde type) was surrounded by a cylindrical glass jacket, allowing temperature control with a circulating thermostated liquid. The downward passage of the meniscus was timed by a photoelectric device. The passage of the meniscus in front of the upper lamp started the counter which had a quartz crystal oscillator. The meniscus stopped the counter as the meniscus passed the lower lamp and the efflux time was registered. This efflux time was converted into a value of intrinsic viscosity through Huggins' equation (Huggins, M. L., J. Am. Chem. Soc., 1942, 64, 2716) based on the flow time of the pure solvent at the same experimental conditions (same viscometer and same temperature). A single polymer solution was used to determine the I.V. [η].

Propylene and butene-1 contents were determined by IR spectroscopy.

The following measurements were used to calculate the propylene content:
 a) Area (ANIR) of the combination absorption bands between 4482 and 3950 cm$^{-1}$ which was used for spectrometric normalization of sample thickness.
 b) Area (A971) of the absorption band due to propylene sequences in the range 986-952 cm$^{-1}$, omitting area beneath a baseline drawn between the endpoints.

The ratio A971/ANIR was calibrated by analyzing reference compositions.

The following measurements were used to calculate the 1-butene content:

Area (ANIR) of the combination absorption bands between 4482 and 3950 cm$^{-1}$ which was used for spectrometric normalization of sample thickness.

Area (Ac4) of the absorption band due to ethyl branches from 1-butene propylene sequences in the range 781-750 cm$^{-1}$, omitting the area beneath a baseline drawn between the endpoints.

The ratio Ac4/ANIR was calibrated by analyzing reference compositions.

Flexural Modulus: ISO 178, measured on 4 mm compression molded sheets 24 hours after molding. Compression molded specimens were prepared according to ISO 293 and ISO 1872-2.

Measurements on Injection Molded Specimens

Tensile strength and elongation at yield: (ISO 527-3; 50 mm/min), measured on 4 mm injection molded specimens 24 hours after injection.

Tensile strength at and elongation at break: (ISO 527-3; 50 mm/min), measured on 4 mm injection molded specimens 24 hours after injection.

Softening Vicat temperature: (ISO 306) measured on 4 mm injection molded specimens 24 hours after injection.

H.D.T. at 0.455 MPa load: (ISO 75) measured on 4 mm injection molded specimens 24 hours after injection.

Measurements on Extruded Specimens

Tensile strength and elongation at yield: (ISO 527-3; 500 mm/min), measured on 1 mm extruded sheets 48 hours after extrusion.

Tensile strength at and elongation at break: (ISO 527-3; 500 mm/min), measured on 1 mm extruded sheets 48 hours after extrusion.

The sheets specimens were die cut from 1 mm thick sheets which were extruded using a laboratory sized Brabender 30 mm extruder (30 L/D). The extruder temperature profile was set to have a melt temperature of 260-270° C. while total polymer output was at 5 kg/h.

The polyethylene component A), having a density of about 0.920 to about 0.940 g/cm$^3$, is a copolymer of ethylene with one or more comonomers selected from α-olefins having formula $CH_2=CHR$, wherein R is an alkyl radical, linear or branched, having from 1 to 10 carbon atoms. In some embodiments, the α-olefins are selected from the group consisting of propylene, butene-1, pentene-1,4-methylpentene-1, hexene-1, octene-1 and decene-1.

In some embodiments, the polyolefin composition is made from or contains from about 60 to about 70 wt. %, based upon the total weight of the polyolefin composition, of component A), and from about 30 to about 40 wt. %, based upon the total weight of the polyolefin composition, of component B).

In some embodiments, the total amount of α-olefin comonomer in polyethylene component A) is from about 4 to about 15 wt. %, based upon the weight of polyethylene component A); alternatively from about 6 to about 12 wt. %.

In some embodiments, the α-olefin comonomer in polyethylene component A) is propylene, butene-1, or a mixture of propylene and butene-1.

In some embodiments, the polyethylene component A) is made from or contains from about 2 to about 5 wt. % of propylene, based upon the weight of polyethylene component A), and from about 4 to about 7 wt. % of butene-1, based upon the weight of polyethylene component A).

In some embodiments, the polyethylene component A) has a solubility in xylene ($XS_A$) at 25° C. of less than about 10 wt. %, based upon the weight of polyethylene component A), alternatively of less than about 8 wt. %, alternatively in the range from about 1 to about 10 wt. %, alternatively in the range from about 1 to about 8 wt. %.

The ethylene copolymer of component B) is a copolymer of ethylene with one or more comonomers selected from α-olefins having formula $HC_2=CHR^I$, where $R^I$ is an alkyl radical, linear or branched, having from 1 to 8 carbon atoms.

In some embodiments, the α-olefins are selected from the group consisting of propylene, butene-1, pentene-1,4-methylpentene-1, hexene-1, octene-1 and decene-1.

In some embodiments, the ethylene copolymer of component B) is a copolymer of ethylene with propylene. In some embodiments, the ethylene copolymer of component B) is made from or contains from about 35 to about 45 wt. %, based upon the weight of the ethylene copolymer, of propylene and from about 55 to about 75 wt. % of ethylene, based upon the weight of the ethylene copolymer.

In some embodiments, the ethylene copolymer of component B) has a fraction soluble in xylene ($XS_B$) of at least about 50 wt. %, based upon the weight of the ethylene copolymer, alternatively from about 50 to about 95 wt. %, alternatively from about 70 to about 95 wt. %.

In some embodiments, the intrinsic viscosity [η] of the $XS_B$ fraction is about 2 dl/g, alternatively from about 2 to about 3.5 dl/g.

In some embodiments, the polyolefin composition has a melting peak at a temperature Tm of about 120° C. or higher, alternatively from about 120° C. to about 130° C., measured by Differential Scanning calorimetry with a heating rate of 20° C. per minute.

In some embodiments, the melt flow rate (MFR) of the polyolefin composition is from about 0.3 to about 5 g/10 min., alternatively from about 0.5 to about 3 g/10 min., determined according to ISO 1133 at 230° C. with a load of 2.16 kg.

In some embodiments, the polyolefin composition has at least one of the following additional features:
 a MFR value of the polyethylene component A), determined according to ISO 1133 at 230° C. with a load of 2.16 kg, of from about 1 to about 15 g/10 min.;
 an ethylene content, determined on the total amount of A)+B), of about 70 to about 95% by weight, alternatively of about 75 to about 90% by weight;
 an amount of total fraction $XS_{TOT}$ soluble in xylene at 25° C., determined by extraction carried out on the total amount of A)+B), of about 20% to about 50% by weight, alternatively of about 30 to about 40% by weight;
 an intrinsic viscosity [η] of the $XS_{TOT}$ fraction of about 1.8 dl/g or more, alternatively from about 1.8 to about 3.0 dl/g;
 a flexural modulus value from about 90 to less than about 260 MPa, alternatively from about 90 to about 230 MPa.

In some embodiments, the polyolefin composition has a density ranging from about 0.890 g/cm³ to about 0.930 g/cm³, alternatively from about 0.895 g/cm³ to about 0.920 g/cm³. In some embodiments, the polyolefin composition has a melt flow rate ranging from about 1 g/10 min. to about 10 g/10 min., alternatively from about 1 g/10 min. to about 5 g/10 min. In some embodiments, the polyolefin composition has a tensile strength at yield ranging from about 2 MPa to about 10 MPa, alternatively from about 3 MPa to about 9 MPa. In some embodiments, the polyolefin composition has an elongation at yield ranging from about 20% to about 40%, alternatively from about 30% to about 35%. In some embodiments, the polyolefin composition has a tensile strength at break ranging from about 5 MPa to about 15 MPa, alternatively from about 6 MPa to about 13 MPa. In some embodiments, the polyolefin composition has an elongation at break ranging from about 300% to about 1000%, alternatively from about 400% to about 800%. In some embodiments, the polyolefin composition has a Vicat ranging from about 65° C. to about 100° C., alternatively from about 70° C. to about 90° C. In some embodiments, the polyolefin composition has a HdT at 0.455 MPa ranging from about 30° C. to about 50° C., alternatively from about 35° C. to about 45° C.

In some embodiments, the polyolefin composition is prepared by a sequential polymerization process, including at least two sequential steps, wherein components A) and B) are prepared in separate subsequent steps, by operating in each step, except the first step, in the presence of the polymer formed and the catalyst used in the preceding step. The catalyst is added in the first step and remains active for the subsequent steps.

In some embodiments, the polymerization process is (a) continuous or batch-type and (b) carried out in a liquid phase, in a gas phase, or by mixed liquid-gas techniques. In some embodiments, the liquid phase is in the presence of inert diluent.

In some embodiments, the polymerization temperature is from about 50 to about 100° C. In some embodiments, the pressure is atmospheric or higher.

In some embodiments, the molecular weight is regulated. In some embodiments, regulation of the molecular weight is carried out by hydrogen.

In some embodiments, polymerization is carried out in the presence of a Ziegler-Natta catalyst. In some embodiments, the Ziegler-Natta catalyst is made from or contains the product of the reaction of an organometallic compound of Group 1, 2 or 13 of the Periodic Table of Elements with a transition metal compound of Groups 4 to 10 of the Periodic Table of Elements (new notation). In some embodiments, the transition metal compound is selected among the compounds of Ti, V, Zr, Cr and Hf. In some embodiments, the transition metal compound is supported on active $MgCl_2$.

In some embodiments, the catalysts are made from or contain the product of the reaction of the organometallic compound of Group 1, 2 or 13 of the Periodic Table of Elements, with a solid catalyst component made from or containing a Ti compound and an electron donor compound supported on active $MgCl_2$.

In some embodiments, the organometallic compounds are aluminum alkyl compounds.

In some embodiments, the polyolefin composition is obtainable by using a Ziegler-Natta catalyst, alternatively a Ziegler-Natta catalyst supported on active $MgCl_2$, alternatively a Ziegler-Natta catalyst made from or containing the product of reaction of:

1) a solid catalyst component made from or containing a Ti compound and an electron donor (internal electron-donor) supported on active $MgCl_2$;
2) an aluminum alkyl compound (cocatalyst); and, optionally,
3) an electron-donor compound (external electron-donor).

In some embodiments, the solid catalyst component (1) contains, as an electron-donor, a compound selected from the group consisting of ethers, ketones, lactones, compounds containing N, P and/or S atoms, and mono- and dicarboxylic acid esters.

In some embodiments, the catalyst is selected from the group of catalysts described in U.S. Pat. No. 4,399,054 and European Patent No. 45977, both incorporated herein by reference in their entirety.

In some embodiments, the electron-donor compounds are selected from the group consisting of phthalic acid esters and succinic acid esters. In some embodiments, the electron-donor compound is diisobutyl phthalate.

In some embodiments, the electron-donor compounds are succinic acid esters represented by the formula (I):

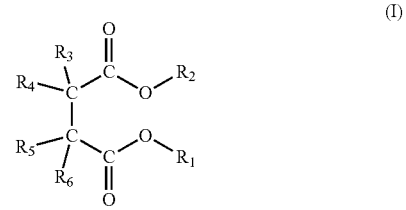

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

In some embodiments, $R_1$ and $R_2$ are $C_1$-$C_8$ alkyl, cycloalkyl, aryl, arylalkyl and alkylaryl groups. In some embodiments, $R_1$ and $R_2$ are selected from the group consisting of primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, at least two radicals different from hydrogen are linked to different carbon atoms. In some embodiments, the two radicals are $R_3$ and $R_5$. In some embodiments, the two radicals are $R_4$ and $R_6$.

In some embodiments, the electron-donors are selected from the group of 1,3-diethers described in European Patent Application Nos. EP 0 361 493 B1 and EP 0 728 769 B1, incorporated herein by reference in their entirety.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the external electron-donors (added to the Al-alkyl compound) are made from or contain aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula $R^1_a R^2_b Si(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of $(tert-butyl)_2Si(OCH_3)_2$, $(cyclohexyl)(methyl)Si(OCH_3)_2$, $(phenyl)_2Si(OCH_3)_2$ and $(cyclopentyl)_2Si(OCH_3)_2$.

In some embodiments, the previously-described 1,3-diethers are external donors. In some embodiments, when the internal donor is a 1,3-diether, the external donor is omitted.

In some embodiments, catalysts are precontacted with small quantities of olefin (prepolymerization) by maintaining the catalyst in suspension in a hydrocarbon solvent, and by polymerizing at temperatures from room temperature to 60° C., thereby producing a quantity of polymer from 0.5 to 3 times the weight of the catalyst.

In some embodiments, the precontact step takes place in liquid monomer, thereby producing a quantity of polymer up to 1000 times the weight of the catalyst.

In some embodiments, the polyolefin composition also contains additives. In some embodiments, the additives are selected from the group consisting of antioxidants, light stabilizers, heat stabilizers, colorants and fillers.

In some embodiments, the polyolefin composition is compounded with other polyolefins. In some embodiments, the other polyolefins are propylene polymers. In some embodiments, the propylene polymers are selected from the group consisting of propylene homopolymers, random copolymers, and thermoplastic elastomeric polyolefin compositions.

In a general embodiment, a polyolefin composition is designated alternatively as "second polyolefin composition" or a "composite polyolefin" is made from or contains the previously-described polyolefin composition, which is hereafter designated as "first polyolefin composition".

In some embodiments, the second polyolefin composition is made from or contains (I) at least about 50% by weight, based upon the total weight of the second polyolefin composition, of an additional polyolefin, and (II) up to about 50%, based upon the total weight of the second polyolefin composition of the first polyolefin composition. In some embodiments, the additional polyolefin is present in an amount from about 50% to 85% by weight, based upon the total weight of the second polyolefin composition. In some embodiments, the first polyolefin composition is present in an amount from about 15% to about 50% by weight, based upon the total weight of the second polyolefin composition.

In some embodiments, the additional polyolefin is selected from the group consisting of:

1. crystalline propylene homopolymers;
2. crystalline propylene copolymers with ethylene or a $C_4$-$C_{10}$ α-olefin, wherein the total comonomer content ranges from about 0.05 to about 20% by weight with respect to the weight of the copolymer;
3. crystalline ethylene homopolymers and copolymers with propylene or a $C_4$-$C_{10}$ α-olefin; and
4. thermoplastic elastomeric compositions made from or containing a propylene homopolymer or copolymer of item 2) and an elastomeric moiety made from or containing a copolymer of ethylene with propylene or $C_4$-$C_{10}$ α-olefins, optionally containing minor quantities of a diene, wherein the diene content may be from about 1 to about 10% by weight, based upon the weight of the ethylene copolymer. In some embodiments, the crystalline propylene homopolymers are selected from the group consisting of isotactic or mainly isotactic homopolymers. In some embodiments, the crystalline propylene copolymers incorporate $C_4$-$C_{10}$ α-olefins selected from the group consisting of 1-butene, 1-hexene, 4-methyl-1-pentene. and 1-octene. In some embodiments, the crystalline ethylene-based polymer is HDPE. In some embodiments, the diene is selected from the group consisting of butadiene, 1,4-hexadiene, 1,5-hexadiene, and ethylidene-1-norbornene. In some embodiments, the thermoplastic elastomeric compositions are prepared by mixing the components in the molten state or by sequential polymerization. In some embodiments, the elastomeric moiety is present is an amount from about 5 to about 80% by weight, based upon the total weight of the thermoplastic elastomeric composition.

In some embodiments, the second polyolefin composition is manufactured by mixing the first polyolefin composition and the additional polyolefin(s) together, extruding the mixture, and pelletizing the resulting composition.

In some embodiments, the second polyolefin composition contains additives. In some embodiments, the additives are selected from the group consisting of mineral fillers, colorants and stabilizers. In some embodiments, the mineral fillers are selected from the group consisting of talc, $CaCO_3$, silica, wollastonite ($CaSiO_3$), clays, diatomaceaous earth, titanium oxide and zeolites. In some embodiments, the mineral filler have an average particle diameter ranging from about 0.1 to about 5 micrometers. In some embodiments, the additives are present in an amount of about 5 to about 30 wt. % of the amount of the second polyolefin composition.

In a general embodiment, the present disclosure provides articles manufactured by using the polyolefin compositions. In some embodiments, the articles are geomembranes. In some embodiments, the geomembranes are used to line landfill sites to prevent the passage of contaminants in the landfill site through to the ground water. In some embodiments, the geomembranes are used to provide an impermeable barrier for the containment of water reservoirs. In some embodiments, the geomembranes are used to contain a reservoir of salt water. In some embodiments, the water from the salt water is permitted to evaporate and the remaining salt is contained by the geomembrane. In some embodiments, geomembranes are used in processes to separate salt from salt water (and conversely water from salt water).

In some embodiments, an extrusion method is used to prepare the geomembrane. Extrusion methods include blown extrusion, cast extrusion and extrusion coating.

In some embodiments, the geomembranes are manufactured by an extrusion method where the polyolefin composition in pelletized form is mixed with a pelletized concentrate or masterbatch. In some embodiments, the masterbatch is made from or contains additive formulants. In some embodiments, the additive formulants are selected from the group consisting of carbon black (or titanium dioxide in the case of white membranes), antioxidants and stabilizers. The mixture is then fed to an extruder where the materials are heated, intimately mixed and sheared using a tapered flighted screw. The melt is mixed to ensure homogeneous distribution and dispersion of the additives. The melt is then forced through a die—either a flat die (in the cast sheet extrusion method) or an annular die (in the blown bubble method, in which a thin sheet of about 1 to about 2.5 mm thickness is produced).

EXAMPLES

The various embodiments, compositions and methods as provided herein are disclosed further below in the following examples. These examples are illustrative only and not intended to limit the scope of this disclosure in any manner whatsoever.

Example 1

Preparation of the Polyolefin Composition

The solid catalyst component used in polymerization is a Ziegler-Natta catalyst component supported on magnesium chloride, containing titanium and diisobutylphthalate as internal donor.

An initial amount of microspheroidal $MgCl_2 \cdot 2.8C_2H_5OH$ was prepared according to the method described in Example 2 of U.S. Pat. No. 4,399,054, incorporated herein by reference, but operating at 3,000 rpm instead of 10,000. The adduct was then subjected to thermal dealcoholation at increasing temperatures from 30 to 130° C. under nitrogen stream until the molar alcohol content per mol of Mg was 1.16.

Into a 1000 mL four-necked round flask, purged with nitrogen, 500 mL of $TiCl_4$ were introduced at 0° C. While stirring, 30 grams of the microspheroidal $MgCl_2 \cdot 1.16C_2H_5OH$ adduct were added. The temperature was raised to 120° C. and kept at this temperature for 60 minutes. During the temperature increase, an amount of diisobutylphthalate was added such as to have a Mg/diisobutylphthalate molar ratio of 18. After 60 minutes, the stirring was stopped. The liquid was siphoned off. The treatment with $TiCl_4$ was repeated at 100° C. for 1 hour in the presence of an amount of diisobutylphthalate such as to have a Mg/diisobutylphthalate molar ratio of 27. The stirring was stopped. The liquid was siphoned off. The treatment with $TiCl_4$ was repeated at 100° C. for 30 min. After sedimentation and siphoning at 85° C., the solid was washed six times with anhydrous hexane (6×100 ml) at 60° C.

The solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio was equal to 4.

The catalyst system was subjected to prepolymerization by maintaining the catalyst system in suspension in liquid propylene at 50° C. for about 75 minutes.

The polymerization was carried out continuously in a series of two gas-phase reactors equipped with devices to transfer the product from the first reactor to the second one.

In the first gas phase polymerization reactor, a polyethylene with 3.4 wt. % of propylene and 5.2 wt. % of butene-1 (component A), both based on the weight of the polyethylene, was produced by feeding the prepolymerized catalyst system, hydrogen (used as molecular weight regulator), ethylene and butene-1 in the gas state in a continuous and constant flow.

The polyethylene formed in the first reactor was continuously discharged and, after having been purged of unreacted monomers, was introduced into the second gas phase reactor in a continuous flow with quantitatively constant flows of hydrogen, ethylene and propylene, each in the gas state.

In the second reactor, a copolymer of ethylene with propylene made from or containing 40 wt. %, based upon the weight of the copolymer, of propylene was produced (component B). Polymerization conditions, molar ratio of the reactants and composition of the copolymers obtained are shown in Table I.

The polymer particles exiting the second reactor were subjected to a steam treatment to remove the reactive monomers and volatile substances, and then dried.

Then the polyolefin composition was mixed with a stabilizing additive composition in a twin screw extruder Berstorff ZE 25 (length/diameter ratio of screws: 33) and extruded under nitrogen atmosphere in the following conditions:

Rotation speed: 250 rpm;
Extruder output: 15 kg/hour;
Melt temperature: 280-290° C.
From the extruder, a stabilized polyolefin composition was discharged, made from or containing the following additives:
0.1% by weight of Irganox® 1010;
0.1% by weight of Irgafos® 168;
0.04% by weight of DHT-4A (hydrotalcite), weights based upon the weight of the stabilized polyolefin composition.

Irganox® 1010 is 2,2-bis[3-[, 5-bis(1,1-dimethylethyl)-4-hydroxyphenyl]-1-oxopropoxy]methyl]-1,3-propanediyl-3, 5-bis(1,1-dimethylethyl)-4-hydroxybenzene-propanoate, while Irgafos® 168 is tris(2,4-di-tert.-butylphenyl)phosphite.

TABLE I

| | | Example No. 1 |
|---|---|---|
| $1^{st}$ Reactor (component A) | | |
| Temperature | ° C. | 75 |
| Pressure | barg | 20 |
| H2/C2– | mol. | 0.54 |
| C2–/(C2– + C3–) | mol. | 0.98 |
| C4–/(C4– + C2–) | mol. | 0.058 |
| Split | wt % | 65 |
| Xylene soluble ($XS_A$) | wt % | 5.2 |
| MFR of A) | g/10 min. | 7.3 |
| Density of A) | g/cm³ | 0.930 |
| C3– content of A) | wt % | 3.4 |
| C4– content of A) | wt % | 5.3 |
| $2^{nd}$ Reactor (component B) | | |
| Temperature | ° C. | 65 |
| Pressure | barg | 20 |
| H2/C2– | mol. | 0.19 |
| H2/C3– | mol. | 0.15 |
| C2–/(C2– + C3–) | mol. | 0.45 |
| Split | wt % | 35 |
| C3– content of B)* | wt % | 40 |
| Xylene soluble of B)* ($XS_B$) | wt % | 90 |
| C3– content of A + B) | wt % | 14.5 |
| Xylene soluble of A + B) (XS) | wt % | 34.0 |
| Intrinsic Viscosity of A + B XSIV | dl/g | 2.55 |
| Tm of A) + B) | ° C. | 123.7 |
| ΔHm of A) + B) | J/gr | 87.4 |

Notes:
C3– = propylene;
C2– = ethylene;
C4– = butene-1;
split = amount of polymer produced in the concerned reactor.
*Calculated values Table II reports the properties measured on injection molded and compression molded specimens. The compression molded specimens were used for the Flexural Modulus measurement.

Table III reports the tensile properties measured on extruded sheets with comparative examples based upon Examples 3 and 4 of Patent Cooperation Treaty Publication No. WO 2014/025982, incorporated herein by reference, which were blends of HDPE with 20 and 40 wt. % of flexible polypropylene (fPP), respectively.

TABLE II

|  |  | Example Ex. 1 |
| --- | --- | --- |
| Density | g/cm³ | 0.9055 |
| MFR | g/10 min. | 2.0 |
| Flexural Modulus | MPa | 210 |
| Tensile Strength at Yield | MPa | 6.5 |
| Elongation at Yield | % | 32.8 |
| Tensile strength at break | MPa | 9.4 |
| Elongation at break | % | 550 |
| Vicat | °C. | 78.8 |
| HdT (@ 0.455 MPa) | °C. | 38.9 |

TABLE III

|  |  | Example | | |
| --- | --- | --- | --- | --- |
|  |  | Ex. 1 | Ex. 4 of WO 2014/ 025982 | Ex. 3 of WO 2014/ 025982 |
| Tensile Strength at Yield (MD) | MPa | 7.9 | 14.2 | 18.3 |
| Elongation at Yield (MD) | % | 26.6 | 19.7 | 13.6 |
| Tensile strength at break (MD) | MPa | 13.6 | 29.3 | 30.2 |
| Elongation at break (MD) | % | 895 | 805 | 739 |
| Tensile Strength at Yield (TD) | MPa | 7.7 | 13.1 | 18.1 |
| Elongation at Yield (TD) | % | 25.1 | 18.8 | 13.8 |
| Tensile strength at break (TD) | MPa | 13.3 | 23.2 | 16.5 |
| Elongation at break (TD) | % | 1000 | 795 | 765 |

MD = Machine Direction
TD = Transverse Direction

Table IV compares the flexural modulus of Example 1 with comparative examples based upon Examples 3, 4, 8 and 9 of Patent Cooperation Treaty Publication No. WO 2014/025982.

TABLE IV

|  |  | WO 2014/025982 | | | |
| --- | --- | --- | --- | --- | --- |
|  | Ex. 1 | Ex. 3 | Ex. 4 | Ex. 8 | Ex. 9 |
| Flexural Modulus (MPa) | 210 | 785 | 410 | 480 | 330 |

It is to be noted that the flexural moduli were measured on a blend of HDPE with 20 wt. % of fPP (Ex. 3 of WO 2014/025982), a blend of HDPE with 40 wt. % of fPP (Ex. 4 of WO 2014/025982), a blend of MDPE with 20 wt. % of fPP (Ex. 8 of WO 2014/025982), and a blend of MDPE with 40 wt. % of fPP (Ex. 9 of WO 2014/025982).

What is claimed is:

1. A polyolefin composition comprising:
   A) from about 55 to about 75 wt. %, based upon the total weight of the polyolefin composition, of a polyethylene having a density of about 0.920 to about 0.940 g/cm³ and a fraction soluble in xylene ($XS_A$) of less than about 10 wt. %, based upon the weight of the polyethylene, the polyethylene comprising ethylene and one or more comonomers selected from α-olefins having formula $CH_2=CHR$, wherein R is an alkyl radical, linear or branched, having from 1 to 10 carbon atoms; and
   B) from about 25 to about 45 wt. %, based upon the total weight of the polyolefin composition, of a copolymer of ethylene with one or more comonomers selected from α-olefins having formula $HC_2=CHR^I$, where $R^I$ is an alkyl radical, linear or branched, having from 1 to 8 carbon atoms, comprising from about 50 to about 70 wt. %, based upon the weight of the copolymer of ethylene, of ethylene and having a fraction soluble in xylene ($XS_B$) of at least about 50 wt. %, based upon the weight of the copolymer of ethylene;
   the polyolefin composition having a flexural modulus of less than about 260 MPa as measured according to ISO 178.

2. The polyolefin composition according to claim 1, wherein the amount of the α-olefin comonomer in polyethylene component A) is from about 4 to about 15 wt. %, based upon the weight of polyethylene component A).

3. The polyolefin composition according to claim 1, wherein the α-olefin comonomer in polyethylene component A) is propylene, butene-1, or a mixture of propylene and butene-1.

4. The polyolefin composition according to claim 3, wherein the polyethylene component A) comprises from about 2 to about 5 wt. %, based upon the weight of polyethylene component A), of propylene and from about 4 to about 7 wt. %, based upon the weight of polyethylene component A), of butene-1.

5. The polyolefin composition according to claim 1, wherein the polyethylene component A) has a solubility in xylene ($XS_A$) at 25° C. of less than about 8 wt. %, based upon the weight of polyethylene component A).

6. The polyolefin composition according to claim 1, wherein the ethylene copolymer of component B) comprises from about 35 to about 45 wt. % of propylene, based upon the weight of ethylene copolymer of component B).

7. The polyolefin composition according to claim 1, wherein the ethylene copolymer of component B) has a fraction soluble in xylene ($XS_B$) of from about 70 to about 95 wt. %, based upon the weight of ethylene copolymer of component B).

8. The polyolefin composition according to claim 1, having an ethylene content, determined on the total amount of A)+B), of about 70% to about 95% by weight.

9. The polyolefin composition according to claim 1, comprising from about 60 to about 70 wt. %, based upon the total weight of the polyolefin composition, of Component A) and from about 30 to about 40 wt. %, based upon the total weight of the polyolefin composition, of Component B).

10. A polymerization process for producing a polyolefin composition having components A) and B), comprising:
   at least two sequential stages, wherein
   (i) components A) and B) are produced in separate subsequent stages,
   (ii) the polymerization being carried out in each stage, except the first stage, in the presence of the polymer formed and the catalyst used in the preceding stage, and
   (iii) the polyolefin composition having (a) from about 55 to about 75 wt. %, based upon the total weight of the polyolefin composition, of component A) (being a polyethylene having a density of about 0.920 to about 0.940 g/cm³ and a fraction soluble in xylene ($XS_A$) of less than about 10 wt. %, based upon the weight of the polyethylene, the polyethylene made from and containing ethylene and one or more comonomers selected from α-olefins having formula $CH_2=CHR$, wherein R is an alkyl radical, linear or branched, having from 1 to 10 carbon atoms), (b) from about 25 to about 45 wt. %, based upon the total weight of the polyolefin composition, of component B) (being a copolymer of ethylene with one or more comonomers selected from α-olefins having formula $HC_2=CHR^I$, where $R^I$ is an alkyl radical, linear or branched, having from 1 to 8 carbon atoms, comprising from about 50 to about 70 wt. %, based upon the weight of the copolymer of ethylene, of ethylene and having a fraction soluble in xylene ($XS_B$) of at least about 50 wt. %, based upon the weight of the copolymer of ethylene), and (c) a flexural modulus of less than about 260 MPa as measured according to ISO 178.

11. A composite polyolefin composition comprising:
(i) up to about 50% by weight, based upon the total weight of the composite polyolefin, of a first polyolefin composition comprising
   A) from about 55 to about 75 wt. %, based upon the total weight of the first polyolefin composition, of a polyethylene having a density of about 0.920 to about 0.940 g/cm³ and a fraction soluble in xylene ($XS_A$) of less than about 10 wt. %, based upon the weight of the polyethylene, the polyethylene made from and containing ethylene and one or more comonomers selected from α-olefins having formula $CH_2=CHR$, wherein R is an alkyl radical, linear or branched, having from 1 to 10 carbon atoms, and
   B) from about 25 to about 45 wt. %, based upon the total weight of the first polyolefin composition, of a copolymer of ethylene with one or more comonomers selected from α-olefins having formula $HC_2=CHR^I$, where $R^I$ is an alkyl radical, linear or branched, having from 1 to 8 carbon atoms, comprising from about 50 to about 70 wt. %, based upon the weight of the copolymer of ethylene, of ethylene and having a fraction soluble in xylene ($XS_B$) of at least about 50 wt. %, based upon the weight of the copolymer of ethylene, and
   having a flexural modulus of less than about 260 MPa as measured according to ISO 178; and
(ii) at least about 50% by weight, based upon the total weight of the composite polyolefin, of an additional polyolefin.

12. The composite polyolefin composition according to claim 11, wherein the additional polyolefin is selected from propylene homoploymers and propylene copolymers.

13. A shaped article comprising
   A) from about 55 to about 75 wt. %, based upon the total weight of the first polyolefin composition, of a polyethylene having a density of about 0.920 to about 0.940 g/cm³ and a fraction soluble in xylene ($XS_A$) of less than about 10 wt. %, based upon the weight of the polyethylene, the polyethylene made from and containing ethylene and one or more comonomers selected from α-olefins having formula $CH_2=CHR$, wherein R is an alkyl radical, linear or branched, having from 1 to 10 carbon atoms, and
   B) from about 25 to about 45 wt. %, based upon the total weight of the first polyolefin composition, of a copolymer of ethylene with one or more comonomers selected from α-olefins having formula $HC_2=CHR^I$, where $R^I$ is an alkyl radical, linear or branched, having from 1 to 8 carbon atoms, comprising from about 50 to about 70 wt. %, based upon the weight of the copolymer of ethylene, of ethylene and having a fraction soluble in xylene ($XS_B$) of at least about 50 wt. %, based upon the weight of the copolymer of ethylene, and
   having a flexural modulus of less than about 260 MPa as measured according to ISO 178.

14. The shaped article according to claim 13, selected from the group consisting of sheets, roofing membranes and geomembranes.

* * * * *

UNITED STATES PATENT AND TRADEMARK OFFICE
CERTIFICATE OF CORRECTION

PATENT NO. : 10,160,848 B2  
APPLICATION NO. : 15/778974  
DATED : December 25, 2018  
INVENTOR(S) : Cavalieri et al.

Page 1 of 1

It is certified that error appears in the above-identified patent and that said Letters Patent is hereby corrected as shown below:

In the Specification

In Column 1, Line 3, after "POLYOLEFIN COMPOSITIONS AND ARTICLES MANUFACTURED THEREFROM" insert -- This application is the U.S. National Phase of PCT International Application PCT/EP2016/077019, filed November 8, 2016, claiming benefit of priority to European Patent Application No. 15195965.7, filed November 24, 2015, the contents of which are incorporated herein by reference in its entirety. --

In Column 2, Line 35, delete "were" and insert -- was --

In Column 8, Line 28, delete "is" and insert -- in --

In Column 8, Line 40, delete "diatomaceaous" and insert -- diatomaceous --

In the Claims

In Column 14, Claim 12, Line 10, delete "homoploymers" and insert -- homopolymers --

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*